Jan. 18, 1938.    N. A. COLUCCI    2,106,049
FREEWHEELING CLUTCH
Filed March 24, 1932    3 Sheets-Sheet 1
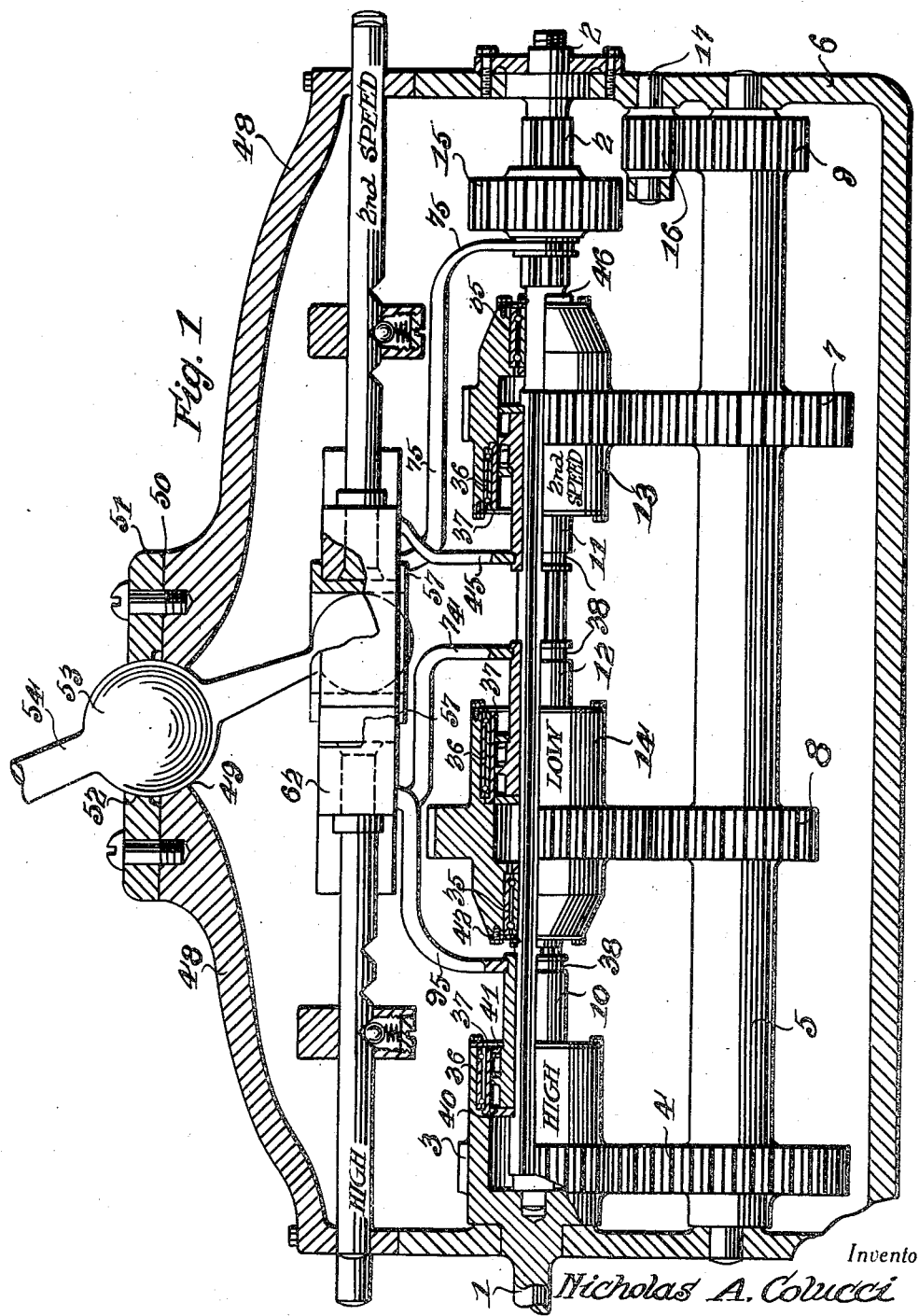
Inventor
Nicholas A. Colucci
By Frank Keifer
Attorney Jan. 18, 1938. N. A. COLUCCI 2,106,049
FREEWHEELING CLUTCH
Filed March 24, 1932 3 Sheets-Sheet 2
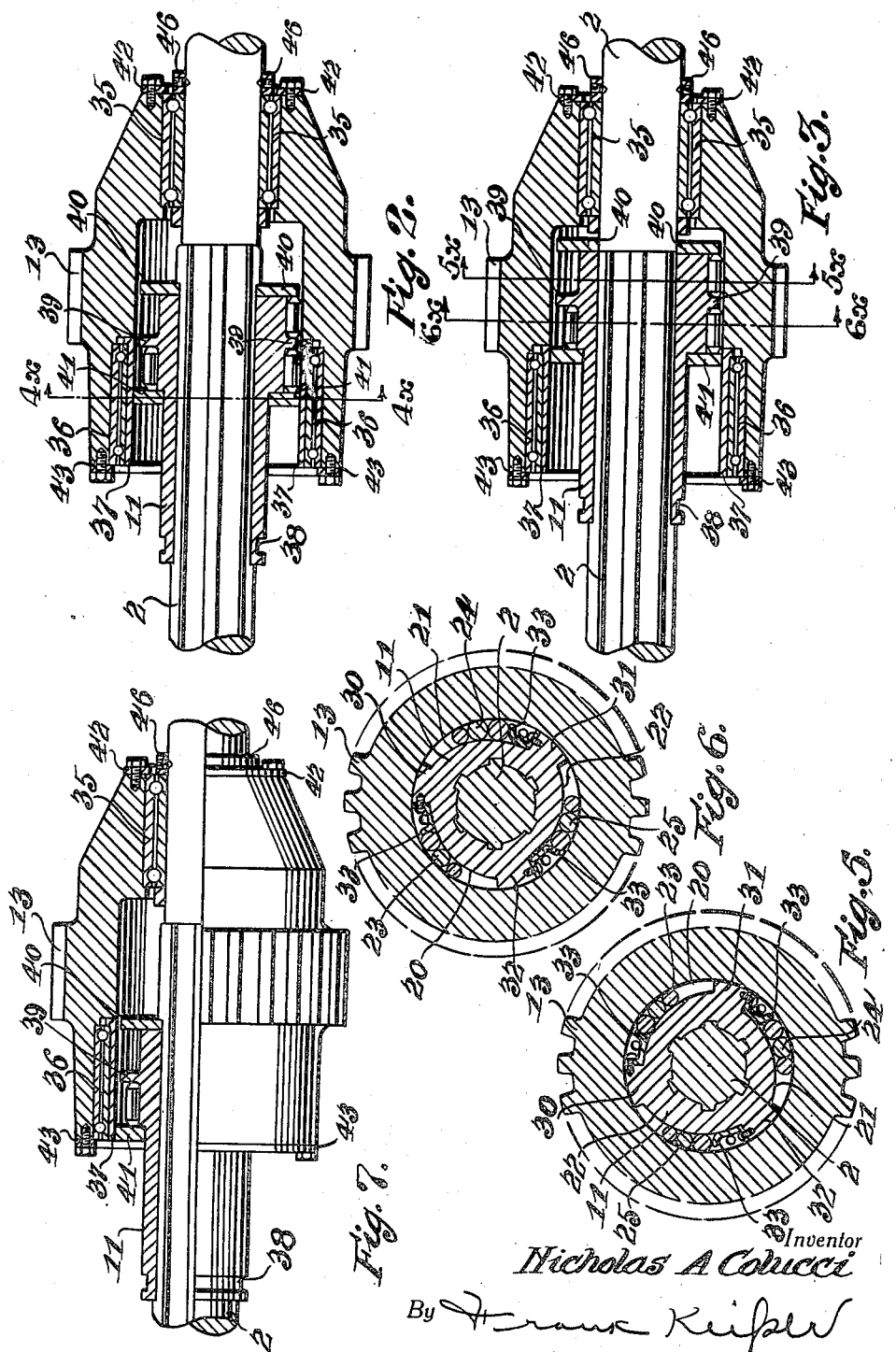
Inventor
Nicholas A Colucci
By Frank Keipler
Attorney

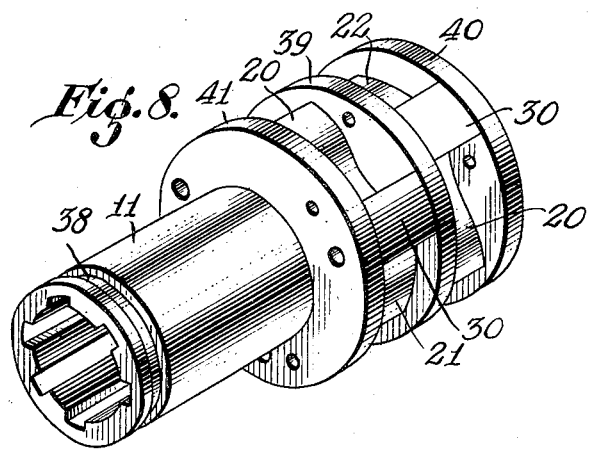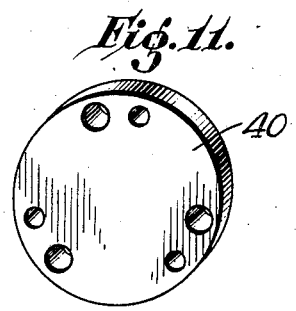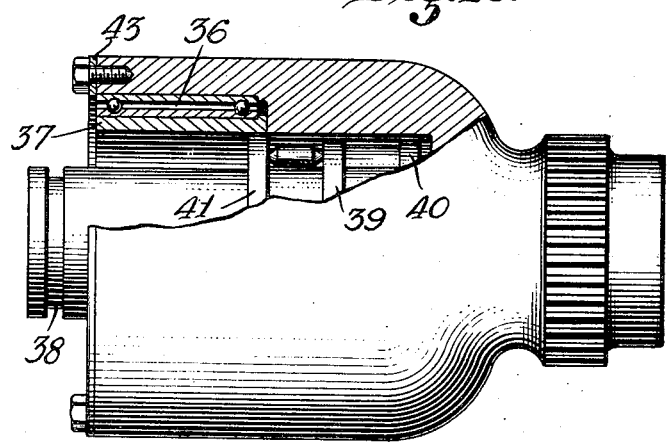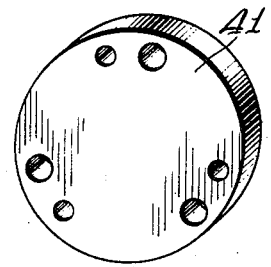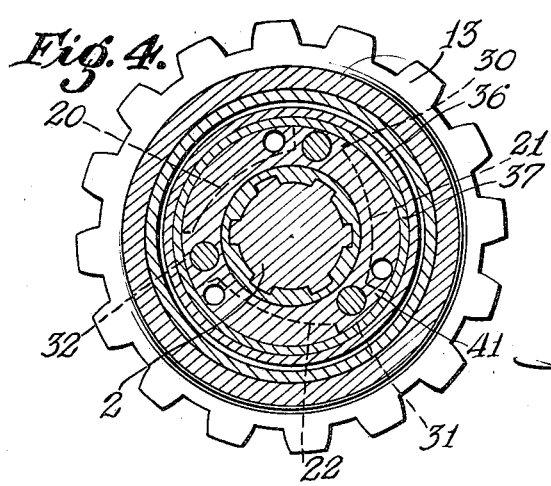

Patented Jan. 18, 1938

2,106,049

UNITED STATES PATENT OFFICE 2,106,049

FREEWHEELING CLUTCH

Nicholas A. Colucci, Rochester, N. Y.

Application March 24, 1932, Serial No. 600,967

12 Claims. (Cl. 192—48)

The object of this invention is to provide a new and improved form of free wheeling clutch for the transmission of an automobile.

Another object of the invention is to provide hollow gears with internal cylindrical surfaces on which the clutch can be directly made for the purpose of driving the gear, and to provide a ball bearing sleeve adjacent thereto inside of the gear on which the clutch can be made for the purpose of running the clutch idle.

These and other objects of the invention will be illustrated in the drawings, described in the specification, and pointed out in the claims at the end thereof.

In the drawings:

Figure 1 is a longitudinal section through the shift gear mechanism of the automobile.

Figure 2 is a longitudinal section through one of the gears, showing the sleeve in free wheeling position.

Figure 3 is a longitudinal section through the same gear, showing the sleeve in conventional position, in which either the engine drives the car or the car drives the engine.

Figure 4 is a vertical section on the line 4x 4x of Figure 2.

Figure 5 is a section on the line 5x 5x of Figure 3.

Figure 6 is a section on the line 6x 6x of Figure 3.

Figure 7 is a longitudinal section through one of the gears, showing the shifting sleeve in neutral position.

Figure 8 is a perspective view of the clutch sleeve without the rollers.

Figure 9 is a detail view of one of the clutch rollers.

Figure 10 is a side elevation of a modified form of the gear and hub in which the gear is of smaller diameter than the hub and the clutch.

Figures 11 and 12 show the collars which hold the locking rollers in place endwise on the clutch sleeve, and the oil holes in the collars, through which the oil passes as the sleeve moves.

In the drawings like reference numerals indicate like parts.

In the drawings reference numeral 1 indicates the shaft of the motor, and 2 indicates the drive shaft. On the shaft 1 is carried a hollow gear 3, which gear is always in mesh with the gear 4 carried on the jack shaft 5, which jack shaft extends the length of the gear casing 6. Keyed on or integral with this jack shaft 5 are the gears or pinions 7, 8, and 9, all of which revolve together with the jack shaft 5.

Splined on the shaft 2 are the sleeves 10, 11 and 12. The sleeve 10 makes a clutch engagement at will with the gear 3, the sleeve 11 makes a clutch engagement at will with the gear 13, and the sleeve 12 makes a clutch engagement at will with the gear 14.

Carried on the same shaft 2 is the gear 15, which is the so-called reverse gear, and when used as such, as shown in Figure 1, it engages with the idle pinion 16, through which it is driven from the gear 9. The pinion 16 is carried on the stud 17, and the gear 15 is adapted to slide along the shaft 2.

The gears 3, 13 and 14 are of different diameters and have a correspondingly different number of teeth thereon. The gears 4, 7 and 8 are of different diameters and are complementary to the gears 3, 13 and 14, with which they are always in mesh.

The gears 3, 13 and 14 are all alike except in size, so that a description of the gear 13 will answer for a description of the other two gears 3 and 14.

Inside of the gear 13 is the sleeve 11, which is splined on the shaft 2 and can move lengthwise thereon. On this sleeve are three eccentric or cam surfaces 20, 21 and 22. Between these eccentrics and the hollow gear 13 are provided three sets of rollers 23, 24, and 25. In each set of rollers are three rollers of different diameters which vary in diameter to correspond with the eccentricity of the eccentrics 20, 21 and 22.

The gear 13 is hollow and is provided with a plain cylindrical surface with which the three sets of rollers can engage.

The rollers above described are shown in Figure 6, and their location is indicated by the section line 6x 6x of Figure 3. On the section line 5x 5x of Figure 3 a similar set of eccentrics and rollers is provided, except that the eccentrics are pitched in the opposite direction. The eccentrics and rollers shown in Figure 5 maintain driving connection with the gear 13 only when the engine is driving the car and the eccentrics and rollers shown in Figure 6 engage with the gear 13 only when the car is driving the engine.

The eccentrics are located between the stops 30, 31, and 32. On one side of each of these stops is placed a flat spring 33 which with a light pressure pushes the rollers toward the raised part of the eccentric, or toward their locking position.

The gears, clutches, etc. run in the gear case 6, which is normally kept full of oil.

At the right hand end the gear 13 has a ball bearing 35 interposed between it and the shaft 2. At the left hand end the gear 13 has a ball bearing 36 interposed between it and the sleeve 37. Because of this ball bearing, the sleeve 37 is free to rotate in either direction independent of the gear 13. When the eccentrics are in the position shown in Figure 3, the locking rollers make a clutch direct with the hollow gear. When the locking rollers are in the position shown in Figure 2, the left hand set of rollers can engage with the sleeve 37, and the right hand set of locking rollers can engage with the gear 13. When the locking rollers are in the position shown in Figure 7, both sets of the locking rollers can engage with the sleeve, but not at the same time, and when either set of locking rollers is in engagement with the sleeve 37, they can be idle or maintain a clutch engagement therewith and will have no effect whatever upon the running of the gear 13.

The sleeve 11 is moved by the shifting fork 45 that is ordinarily used in shifting the gears of an automobile, which fork 45 engages with the annular groove 38 provided in the sleeve.

The sleeve 10, sleeve 12, and reverse gear 15 are adapted to be moved by other shifting forks 95, 74, and 75 respectively, all operable from the usual gear shift lever 54. The specific connections between lever 54 and the several shifting forks are not a part of the present invention.

For the purpose of holding the locking rollers in place, the sleeve 11 is provided with a shoulder 39, which is located between the two sets of eccentrics and rollers. This shoulder spaces the annular sets of rollers apart. At one end of the sleeve is provided a collar 40, which is on one side of the shoulder 39, and the collar 41 is provided on the other side of the shoulder 39. Between the collars 40 and 41 and shoulder 39, the locking rollers are held in place. The collar 41 also forms a bearing for the left hand end of the gear 13. These collars and shoulder have oil holes through which the oil passes as the sleeve moves.

On the right hand end of the gear 13 is provided a collar 42, which holds the bearing 35 in place, and on the other end of the gear is provided a collar 43, which holds the bearing 36 in place.

It will also be understood that the gears 13, and 14 are always held in line with and in mesh with their companion gears 7 and 8, and are held against longitudinal movement on the shaft 2, by means of a collar 46 shown in Figure 7. The gear 3 and shaft 1 is held in place by the shaft 2.

The shift mechanism consists as follows: On top of the gearing casing 6 is provided a cover 48, which has an opening 49 therein. This cover is bolted on top of the gear casing. The cover 48 is provided with a bearing surface 50 which is covered by a plate 51. Between these plates is provided a segmental spherical bearing 52, in which is held a ball 53 carried on the shift lever 54.

The lever 54 and yoke 45 are arranged to move the sleeve 11 into any one of three axial positions, the free wheeling position of Fig. 1, the conventional bidirectional drive position of Fig. 3 and the neutral, or wholly free, position of Fig. 7.

In Figure 1 the lever 54 is shown in the so-called free wheeling position for the second gear, in which position the clutch for the gears 13 and 7 is held in free wheeling position. At the same time the clutches for other gears are all held in neutral position. In this position the motor can drive the car through the second gear but the car cannot drive the motor.

I claim:

1. In a free wheeling clutch for the transmission of power in an automobile, the combination of a hollow gear with an elongated internal cylindrical surface and a clutching device adapted to clutch on said cylindrical surface, a freely rotating sleeve adjacent to said cylindrical surface inside of the gear, on which sleeve said clutching device can engage for the purpose of running the clutching device idle.

2. In a free wheeling clutch for the transmission of power in an automobile, the combination of a hollow gear having an elongated hub with an internal cylindrical surface therein, and a clutching device adapted to clutch on said cylindrical surface radially in line with the teeth on the gear, a freely rotating sleeve adjacent to said cylindrical surface and inside of the gear on which sleeve said clutching device can engage for the purpose of running the clutching device idle.

3. In a free wheeling clutch for the transmission of power in an automobile, the combination of a gear having an elongated hollow hub with an internal cylindrical surface therein, and clutch members extending angularly in opposite directions adapted to clutch on said cylindrical surface, and a freely rotating sleeve adjacent to said cylindrical surface inside of the gear, on which sleeve said clutch members can engage for the purpose of running the clutching device idle.

4. In a free wheeling clutch for the transmission of power in an automobile, the combination of an external gear having an elongated hollow hub having three internal diameters, a splined shaft passing through said hub, a roller bearing of small diameter interposed between one end of the hub at its small diameter and the shaft, a roller bearing of large diameter placed inside of the other end of the hub at its large diameter, a friction clutch sliding on and splined to the shaft, said clutch being adapted to engage either the roller bearing of large diameter or directly with the hub at its intermediate internal diameter between the large and small internal diameters.

5. In a free wheeling clutch for the transmission of power in an automobile, the combination of a hollow gear with an elongated internal cylindrical surface and a clutching device adapted to clutch on said cylindrical surface a freely rotating sleeve adjacent to said cylindrical surface inside of said gear, said clutching device including an elongated sleeve one end of which at all times extends outside of the hollow hub a shifting device connected to said sleeve, a power shaft on which said sleeve slides, said clutching device being capable of connecting the power shaft with the gear or being capable of engaging with the freely rotating sleeve and idling thereon.

6. In a free wheeling clutch for the transmission of power in an automobile, the combination of a splined shaft, a sleeve splined on said shaft, said sleeve having two sets of eccentric clutch surfaces extending angularly in opposite directions thereon, rollers held in position on each of said surfaces, a collar fastened to the end of said sleeve, a collar surrounding the intermediate portion of said sleeve, and a shoulder provided intermediate of said sleeve by which collars and shoulders the rollers are held in place on said sleeve.

7. In a free wheeling clutch for the transmission of power in an automobile, the combination of an external gear having an elongated hollow hub having more than one internal diameter, a splined shaft passing through said hub, a bearing interposed between one end of the hub and the shaft, a roller bearing placed inside of the other end of the hub, said end of the hub having a large diameter, a friction clutch sliding on and splined to the shaft, said clutch being adapted to engage the last named roller bearing or being adapted to engage directly with the hub between said bearings.

8. In a free wheeling clutch for the transmission of power in an automobile, the combination of a gear having an elongated hollow hub, a splined shaft passing through said hub, a bearing interposed between one end of the hub and the shaft, the splines being removed from the shaft for said bearing, a collar fastened to said shaft at each end of said bearing, and a collar fastened to the outer end of the hub extending inwardly to the shaft and interposed between the outer end of the bearing and the collar fastened to the shaft.

9. In a free wheeling clutch for the transmission of power in an automobile, the combination of a splined shaft, a sleeve splined on said shaft, said sleeve having two sets of eccentric clutch surfaces extending angularly in opposite directions thereon, rollers held in position on each of said surfaces, a collar fastened to the end of said sleeve, a collar surrounding the intermediate portion of said sleeve, and a shoulder provided intermediate of said sleeve by which collars and shoulder the rollers are held in place on said sleeve, holes through each of said collars and shoulders permitting the oil to pass through said collars and shoulders in one direction as the clutch mechanism is moved in the other direction.

10. In a clutch mechanism, in combination with a sleeve, eccentric clutch surfaces extending angularly in opposite directions thereon, rollers held in position on each of said surfaces, each of said rollers having a cylindrical body and cone-shaped ends to facilitate the movement of the clutch mechanism sideways.

11. In a free wheeling clutch for the transmission of power in an automobile, the combination of a hollow gear with an elongated internal cylindrical surface and a clutching device adapted to clutch on said cylindrical surface, a freely rotating sleeve adjacent to said cylindrical surface inside of the gear, on which sleeve said clutching device can engage for the purpose of running the clutching device idle, a plate on the side of said gear, said plate being adapted to hold said freely rotating sleeve in said hollow gear.

12. In a clutch for the transmission of power in an automobile, the combination of a hollow gear with an elongated internal cylindrical surface and a clutching device adapted to clutch on said cylindrical surface, a freely rotating sleeve adjacent to said cylindrical surface inside of the gear, said sleeve having an outwardly extending flange at the inner end thereof, a bearing interposed between said freely rotating sleeve and the inner surface of said gear, a plate fastened to the outer side of said gear by which said bearing and freely rotating sleeve are held in said gear.

NICHOLAS A. COLUCCI.